US012715668B2

(12) United States Patent
Knöös et al.

(10) Patent No.: US 12,715,668 B2
(45) Date of Patent: Aug. 25, 2026

(54) GAS BARRIER FILM FOR PACKAGING MATERIAL

(71) Applicant: Stora Enso OYJ, Helsinki (FI)

(72) Inventors: Isabel Knöös, Säffle (SE); Åsa Nyflott, Karlstad (SE); Chris Bonnerup, Floda (SE)

(73) Assignee: Stora Enso OYJ, Helsinki (FI)

( * ) Notice: Subject to any disclaimer, the term of this patent is extended or adjusted under 35 U.S.C. 154(b) by 1083 days.

(21) Appl. No.: 17/595,988

(22) PCT Filed: Jun. 25, 2020

(86) PCT No.: PCT/IB2020/056014
§ 371 (c)(1),
(2) Date: Dec. 1, 2021

(87) PCT Pub. No.: WO2020/261170
PCT Pub. Date: Dec. 30, 2020

(65) Prior Publication Data

US 2022/0340342 A1 Oct. 27, 2022

(30) Foreign Application Priority Data

Jun. 27, 2019 (SE) .................................... 1950802-7

(51) Int. Cl.
*B65D 65/42* (2006.01)
*B32B 27/10* (2006.01)
*D21H 19/08* (2006.01)
*D21H 19/60* (2006.01)

(52) U.S. Cl.
CPC .............. *B65D 65/42* (2013.01); *B32B 27/10* (2013.01); *D21H 19/08* (2013.01); *D21H 19/60* (2013.01); *B32B 2255/205* (2013.01); *B32B 2307/7244* (2013.01); *B32B 2439/70* (2013.01); *B65D 2565/388* (2013.01)

(58) Field of Classification Search
CPC . B32B 2439/70; B32B 29/00; B32B 2255/12; D21H 19/34; D21H 19/52; D21H 11/18
See application file for complete search history.

(56) References Cited

U.S. PATENT DOCUMENTS

2011/0262731 A1 10/2011 Mukai et al.
2011/0262745 A1* 10/2011 Ronka .................... D21H 23/22 427/209
2011/0281487 A1 11/2011 Mukai et al.
2012/0094047 A1 4/2012 Albertson et al.
2012/0216718 A1 8/2012 Berglund et al.
2013/0017400 A1 1/2013 Imai et al.
2013/0022827 A1 1/2013 Imai et al.
2018/0319143 A1 11/2018 Neagu et al.
2022/0154403 A1* 5/2022 Watanabe .............. D21H 19/82

FOREIGN PATENT DOCUMENTS

CN 101205001 A 6/2008
CN 103025813 A 4/2013
EP 2371892 A1 10/2011
EP 2371893 A1 10/2011
EP 2551104 A1 1/2013
EP 2554589 A1 2/2013
JP 2000303386 A 10/2000
JP 2015024537 A 2/2015
JP 2018533499 A 11/2018
WO 2014181560 A1 11/2014
WO 2017163167 A1 9/2017
WO 2017199157 A1 11/2017
WO 2017221137 A1 12/2017
WO 2018002815 A1 1/2018
WO 2018083592 A1 5/2018
WO 2018189698 A1 10/2018
WO 2019092623 A1 5/2019

OTHER PUBLICATIONS

International Search report from corresponding PCT application No. PCT/IB2020/056014 mailed Oct. 29, 2020.
Fengel, D., Ultrastructural behaviour of cell wall polysaccharides, TAPPI, 1970, vol. 53, No. 3, pp. 497-503. (Abstract only).
Chinga-Carrasco, Gary, Cellulose fibres, nanofibrils and microfibrils: The morphological sequence of MFC components from a plant physiology and fibre technology point of view, Chinga-Carrasco Nanoscale Research Letters, 2011, 6:417. http://www.nanoscalereslett.com/content/6/1/417.

* cited by examiner

*Primary Examiner* — Laura A Auer
(74) *Attorney, Agent, or Firm* — Greer, Burns & Crain Ltd.

(57) ABSTRACT

The present invention relates to a gas barrier film for a paper or paperboard based packaging material, said gas barrier film comprising: a microfibrillated cellulose layer (MFC layer), at least one surface of which has been metallized; and a polymer dispersion coating layer disposed on at least one surface of the MFC layer. The present invention further relates to a paper or paperboard based packaging material, containers and carton blanks comprising the gas barrier film, and to a method for manufacturing the gas barrier film.

20 Claims, No Drawings

GAS BARRIER FILM FOR PACKAGING MATERIAL

This application is a U.S. National Phase under 35 U.S.C. § 371 of International Application No. PCT/IB2020/056014, filed Jun. 25, 2020, which claims priority under 35 U.S.C. §§ 119 and 365 to Swedish Application No. 1950802-7, filed Jun. 27, 2019.

TECHNICAL FIELD

The present disclosure relates to gas barrier films for paper and paperboard based packaging materials. More specifically, the present disclosure relates to gas barrier films based on microfibrillated cellulose having a good and stable oxygen transmission rate (OTR) at high relative humidities (RH). The present invention further relates to paper and paperboard based packaging materials comprising such barrier films and to methods for manufacturing such barrier films.

BACKGROUND

Coating of paper and paperboard with plastics is often employed to combine the mechanical properties of the paperboard with the barrier and sealing properties of a plastic film. Paperboard provided with even a relatively small amount of a suitable plastic material can provide the properties needed to make the paperboard suitable for many demanding applications, for example as liquid packaging board. In liquid packaging board, polyolefin coatings are frequently used as liquid barrier layers heat sealing layers and adhesives. However, the recycling of such polymer coated board is difficult since it is difficult to separate the polymers from the fibers.

In many cases the gas barrier properties of the polymer coated paperboard are still insufficient. Therefore, in order to ensure acceptable gas barrier properties the polymer coated paperboard is often provided with one or more layers of aluminum foil. However, due to its high carbon footprint there is a wish to replace aluminum foils in packaging materials in general, and in liquid packaging board in particular.

More recently, microfibrillated cellulose (MFC) films have been developed, in which defibrillated cellulosic fibrils have been suspended e.g. in water and thereafter re-organized and rebonded together to form a dense film with excellent gas barrier properties. Unfortunately, the gas barrier properties of such MFC films tend to deteriorate at high temperatures and high humidity.

Many approaches for improving the gas barrier properties towards oxygen, air, and aromas at high relative humidity have been investigated and described, but most of the suggested solutions are expensive and difficult to implement in industrial scale. One route is to modify the MFC or nanocellulose such as disclosed in EP2554589A1 where an MFC dispersion was modified with a silane coupling agent. Another patent application, EP2551104A1, teaches the use of MFC and polyvinyl alcohol (PVOH) and/or polyuronic acid with improved barrier properties at higher relative humidity. Another solution is to coat the film with a layer that has high water fastness and/or low water vapor transmission rate. JP2000303386A discloses, e.g., latex coated on MFC film, while US2012094047A suggests the use of wood hydrolysates mixed with polysaccharides such as MFC that can be coated with a polyolefin layer. In addition to these methods, the possibility of crosslinking fibrils or fibrils and copolymers has been investigated. This improves water fastness of the films but also water vapor transmission rates. EP2371892A1 and EP2371893A1 describe crosslinking of MFC with metal ions, glyoxal, glutaraldehyde and/or citric acid, respectively.

Another way to decrease the moisture sensitivity of cellulose is to chemically modify the cellulose with sodium periodate to obtain dialdehyde cellulose (DAC). By fibrillation of dialdehyde cellulose, a barrier film with improved moisture resistance can be produced. However, a dispersion comprising microfibrillated dialdehyde cellulose (DA-MFC) is very unstable since the DA-MFC sediments and spontaneously crosslinks to certain degree already in the dispersion, causing the microfibrils to be bound or entangled. The poor stability of the dispersion results in variations of the concentration of DA-MFC in the film leading to poor film formation and barrier properties.

Thus, there remains a need for improved solutions to replace aluminum foils in liquid packaging board, while maintaining acceptable liquid and oxygen barrier properties. At the same time, there is a need to replace polyolefin coatings with alternatives that facilitate re-pulping and recycling of the used liquid packaging board materials.

DESCRIPTION OF THE INVENTION

It is an object of the present disclosure to provide an alternative to the aluminum foils commonly used in liquid packaging board for providing liquid and oxygen barrier properties.

It is a further object of the present disclosure to provide an paper or paperboard based packaging material without an aluminum foil, having an oxygen transfer rate (OTR), measured according to the standard ASTM F-1927 at 80% relative humidity and 23° C., of less than 10 $cc/m^2/24$ h/atm, and preferably less than 5 $cc/m^2/24$ h/atm, and most preferably less than 2 $cc/m^2/24$ h/atm.

It is a further object of the present disclosure to provide a paper or paperboard based packaging material without an aluminium foil having a reject rate according to PTS RH 021/97 of less than 30%, preferably less than 20%.

It is a further object of the present disclosure, to provide gas barrier film comprising microfibrillated cellulose, which has improved barrier properties even at higher relative humidity and temperature.

It is a further object of the present disclosure to provide a gas barrier film or a paper or paperboard based packaging material for liquid packaging board, which facilitates re-pulping of the board.

The above mentioned objects, as well as other objects as will be realized by the skilled person in the light of the present disclosure, are achieved by the various aspects of the present disclosure.

According to a first aspect illustrated herein, there is provided a gas barrier film for a paper or paperboard based packaging material, said gas barrier film comprising:

- a microfibrillated cellulose layer (MFC layer), at least one surface of which has been metallized; and
- a polymer dispersion coating layer disposed on at least one surface of the MFC layer.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

MFC has been identified as an interesting component for use in barrier films for paper and paperboard packaging materials. MFC films have been found to provide low oxygen transfer rates at conditions of intermediate temperature and humidity, e.g. at 50% relative humidity and 23° C. Unfortunately, the gas barrier properties of such MFC films tend to deteriorate significantly at higher temperatures and humidities, e.g. at 90% relative humidity and 38° C., rendering the films unsuitable for many industrial liquid packaging applications.

The present inventor has now found that these deficiencies of prior art laminates comprising MFC can be remedied by a gas barrier film comprising an MFC layer, at least one surface of which has been metallized such that a metallization layer is formed on the surface of the MFC layer, and a polymer dispersion coating layer disposed on at least one surface of the MFC layer.

A gas barrier film comprising an MFC layer provided with a metallization layer and a polymer dispersion coating layer provides both excellent liquid and oxygen barrier properties. Especially remarkable is the high oxygen barrier properties such laminate exhibits at high humidity and temperature. The term high humidity in the context of the present disclosure generally refers to a relative humidity (RH) above 80%. The term high temperature in the context of the present disclosure generally refers to a temperature above 23° C.

The inventive gas barrier film can be used to manufacture a paper or paperboard based packaging material having an oxygen transfer rate (OTR), measured according to the standard ASTM F-1927 at 80% relative humidity and 23° C., of less than 10 cc/m$^2$/24 h/atm, and preferably less than 5 cc/m$^2$/24 h/atm and most preferably less than 2 cc/m$^2$/24 h/atm.

The paper or paperboard based packaging material of the invention is recyclable and may further provide a reject rate according to PTS RH 021/97 of less than 30%, preferably less than 20%.

This makes the inventive gas barrier film an interesting and viable alternative to the aluminum foil layer commonly used in liquid packaging board for providing liquid and oxygen barrier properties.

The inventive gas barrier film is further advantageous in that it can be realized without any extrusion coated or lamination coated polyolefin coatings often used in barrier layers for liquid packaging materials. Instead, the inventive gas barrier film uses a polymer dispersion coating, which is more easily separated from the from the fibrous paper and paperboard materials and thereby facilitates re-pulping of the board.

[MFC]

Microfibrillated cellulose (MFC) shall in the context of the patent application be understood to mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J., March* 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as its large surface area or its ability to form a gel-like material at low solids (1-5 wt %) when dispersed in water. The cellulose fiber is preferably fibrillated to such an extent that the final specific surface area of the formed MFC is from about 1 to about 200 m$^2$/g, or more preferably 50-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment steps are usually required in order to make MFC manufacturing both energy efficient and sustainable. The cellulose fibers of the pulp to be utilized may thus be pre-treated, for example enzymatically or chemically, to hydrolyse or swell the fibers or to reduce the quantity of hemicellulose or lignin. The cellulose fibers may be chemically modified before fibrillation, such that the cellulose molecules contain other (or more) functional groups than found in the native cellulose. Such groups include, among others, carboxymethyl (CMC), aldehyde and/or carboxyl groups (cellulose obtained by N-oxyl mediated oxidation, for example "TEMPO"), quaternary ammonium (cationic cellulose) or phosphoryl groups. After being modified or oxidized in one of the above-described methods, it is easier to separate the fibers into MFC or nanofibrils.

The nanofibrillar cellulose may contain some hemicelluloses, the amount of which is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose, or other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

The MFC of the MFC layer of the inventive gas barrier film may be unmodified MFC or chemically modified MFC, or a mixture thereof. In some embodiments, the MFC is an unmodified MFC. Unmodified MFC refers to MFC made of unmodified or native cellulose fibers. The unmodified MFC may be a single type of MFC, or it can comprise a mixture of two or more types of MFC, differing e.g. in the choice of cellulose raw material or manufacturing method. Chemically modified MFC refers to MFC made of cellulose fibers that have undergone chemical modification before, during or after fibrillation. In some embodiments, the MFC is a chemically modified MFC. The chemically modified MFC may be a single type of chemically modified MFC, or it can comprise a mixture of two or more types of chemically modified MFC, differing e.g. in the type of chemical modification, the choice of cellulose raw material or the manufacturing method. In some embodiments, the chemically modified MFC is microfibrillated dialdehyde cellulose (DA-MFC). DA-MFC is a dialdehyde cellulose treated in such way that it is microfibrillated. Dialdehyde cellulose can be obtained by oxidation of cellulose. Microfibrillated dialdehyde cellulose can be obtained by treating dialdehyde cellulose for example by a homogenizer or in any other way such that fibrillation occurs to produce microfibrillated dialdehyde cellulose. In some embodiments, the MFC of the MFC layer comprises 0-80 wt % DA-MFC, the remainder being unmodified MFC.

The MFC layer may be comprised solely of MFC, or it can comprise a mixture of MFC and other ingredients or additives. The MFC layer of the inventive gas barrier film preferably includes MFC as its main component based on the total dry weight of the MFC layer. In some embodiments, the MFC layer comprises at least 50 wt %, preferably at least 70 wt %, more preferably at least 80 wt % MFC, based on the total dry weight of the MFC layer.

The formulation of the MFC layer may vary depending on the intended use and on the other layers present in the finished multilayer packaging material. The formulation of the MFC layer may also vary depending on the intended mode of application or formation of the MFC layer, e.g. coating of an MFC dispersion onto a substrate or formation of a free standing MFC film for lamination to a substrate. The MFC layer may include a wide range of ingredients in varying quantities to improve the end performance of the product or processing of the coating. The MFC layer may further comprise additives such as starch, carboxymethyl cellulose, a filler, retention chemicals, flocculation additives, deflocculating additives, dry strength additives, softeners, or mixtures thereof. The MFC layer may further comprise additives that will improve different properties of the mixture and/or the produced film such as latex and/or polyvinyl alcohol (PVOH) for enhancing the ductility of the film.

In some embodiments, the MFC layer further comprises a polymeric binder. In some preferred embodiments, the MFC layer further comprises PVOH. The PVOH may be a single type of PVOH, or it can comprise a mixture of two or more types of PVOH, differing e.g. in degree of hydrolysis or viscosity. The PVOH may for example have a degree of hydrolysis in the range of 80-99 mol %, preferably in the range of 88-99 mol %. Furthermore, the PVOH may preferably have a viscosity above 5 mPa×s in a 4% aqueous solution at 20° C. DIN 53015/JIS K 6726.

In some embodiments, the MFC layer further comprises a pigment. The pigment may for example comprise inorganic particles of talcum, silicates, carbonates, alkaline earth metal carbonates and ammonium carbonate, or oxides, such as transition metal oxides and other metal oxides. The pigment may also comprise nano-size pigments such as nanoclays and nanoparticles of layered mineral silicates, for instance selected from the group comprising montmorillonite, bentonite, kaolinite, hectorite and hallyosite.

In some preferred embodiments, the pigment is selected from the group consisting of nanoclays and nanoparticles of layered mineral silicates, more preferably bentonite.

The basis weight (corresponding to the thickness) of the MFC layer of the inventive gas barrier film is preferably in the range of less than 55 gsm (grams per square meter). The basis weight of the MFC layer may for example depend on the mode of its manufacture. For example, coating of an MFC dispersion onto a substrate may result in a thinner layer, whereas the formation of a free standing MFC film for lamination to a substrate may require a thicker layer. In some embodiments, the basis weight of the MFC layer is in the range of 5-50 gsm. In some embodiments, the basis weight of the MFC layer is in the range of 5-20 gsm.

The MFC layer in itself, typically has an oxygen transfer rate (OTR), measured according to the standard ASTM F-1927 at 90% relative humidity and 38° C., of more than 200 cc/m$^2$/24 h/atm or even more than 1000 cc/m$^2$/24 h/atm.

[Metallization]

At least one surface of the MFC layer has been subjected to metallization, i.e. deposition of a thin layer of a metal or metal oxide on the MFC surface. The thin layer of metal or metal oxide on the MFC surface is also referred to herein as the "metallization layer". In some embodiments, only one of the surfaces of the MFC layer has been subjected to metallization. In some embodiments, both surfaces of the MFC layer have been subjected to metallization.

The oxygen barrier properties are typically not further improved by a metallization coating. In fact, deteriorating oxygen barrier properties have previously been observed when metallizing high-density pre-coated papers of higher grammages.

The "metallization layer" is a thin layer of metal or metal oxide providing barrier properties reducing permeability to e.g. oxygen, water, water vapor and light.

In some embodiments, the metallized surface of the MFC layer is formed by vapor deposition of a metal or metal oxide on the MFC layer, preferably by physical vapor deposition (PVD) or chemical vapor deposition (CVD), more preferably by physical vapor deposition (PVD), of the metal or metal oxide layer on the MFC layer.

In some embodiments, the metal or metal oxide of the metallization layer is selected from the group consisting of aluminium, magnesium, silicon, copper, aluminium oxides, magnesium oxides, silicon oxides, and combinations thereof. In a preferred embodiment, the metal or metal oxide is aluminium.

Thin vapour deposited layers are normally merely nanometer-thick, i.e. have a thickness in the order of magnitude of nanometers, for example of from 1 to 500 nm (50 to 5000 A), preferably from 1 to 200 nm, more preferably from 1 to 100 nm and most preferably from 1 to 50 nm.

One type of vapour deposition coating, sometimes used for its barrier properties, in particular water vapour barrier properties, is an aluminium metal physical vapour deposition (PVD) coating. Such a coating, substantially consisting of aluminium metal, may typically have a thickness of from 10 to 50 nm. The thickness of the metallization layer which corresponds to less than 1% of the aluminium metal material typically present in an aluminium foil of conventional thickness for packaging, i.e. 6.3 μm.

In some embodiments, the metallization layer has a layer thickness in the range of 10-100 nm, preferably in the range of 20-50 nm.

In some embodiments, the metallization layer has a weight between 50-250 mg/$m^2$, preferably between 75-150 mg/$m^2$.

[Dispersion Coating]

While vapour deposition metal coatings require significantly less metal material, they normally only provide a low level of oxygen barrier properties, at most, and need to be combined with a further gas barrier material in order to provide a final laminated material with sufficient barrier properties.

The surprisingly exceptional barrier properties at high humidity of the inventive gas barrier film are a result of the combination of the metallization of the MFC layer and the polymer dispersion coating layer disposed on at least one surface of the MFC layer.

The polymer dispersion coating layer may be disposed on a metallized surface of the MFC layer, on a non-metallized surface of the MFC layer, or both.

In some embodiments, the polymer dispersion coating layer is disposed on the at least one surface of the MFC layer which has been metallized. In embodiments, where both surfaces of the MFC layer have been subjected to metallization, the polymer dispersion coating layer may be disposed on one or both of the metallized surfaces of the MFC layer. Metallization has proved to provide very good adhesion properties to adjacent organic polymer layers and films, such that no extra primer or adhesive must be used between these and their adjacent layers in laminated packaging materials.

The polymer dispersion coating layer is provided in the form of a dispersion of a suitable polymer in a liquid medium or solvent, onto the MFC layer, and subsequently dried into a thin coating. It is important that the dispersion or solution is homogeneous and stable, to result in an even coating with uniform barrier properties. Such dispersion coated layers may be made very thin, down to tenths of a gram per $m^2$, and may provide high quality, homogenous layers, provided the dispersion or solution is homogeneous and stable. Furthermore, such dispersion coated layers from water-dispersible polymers often provide good internal adhesion to adjacent layers, which contributes to good integrity of the final packaging material.

The polymer may for example be selected from the group consisting of vinyl alcohol-based polymers, such as PVOH or water dispersible EVOH, acrylic acid or methacrylic acid based polymers (PAA, PMAA), polysaccharides such as for example starch or starch derivatives, cellulose nanofibrils (CNF), nanocrystalline cellulose (NCC), chitosan, hemicellulose or other cellulose derivatives, water dispersible polyvinylidene chloride (PVDC) or water dispersible polyesters, or combinations of two or more thereof.

In some embodiments, the polymer dispersion coating is a latex, a polyvinyl alcohol, or a polyolefin dispersion coating.

In some embodiments, the polymer dispersion coating is a polyolefin dispersion, preferably a dispersion of a copolymer of polyethylene and polypropylene.

In some embodiments, the polymer dispersion coating is a styrene-acrylic (SA) or styrene-butadiene (SB) latex coating.

In some embodiments, the latex coating has a $T_g$ below 10° C., preferably below 0° C., more preferably below −10° C. This has been found to improve the adhesion of the polymer dispersion coating to the MFC layer and, when used as an adhesive polymer layer disposed between the MFC layer and a paper or paperboard substrate, to improve the adhesion of the MFC film to the substrate.

In some embodiments, the polymer dispersion coating further comprises a pigment. The pigment facilitates the re-pulping of the material and in addition it enables the use of higher temperature at the calendaring of the laminate when the laminated layers are fused together. However, the amount of pigment should preferably be kept at a low level to enable adhesion between the substrate and the MFC film. In some embodiments, the polymer dispersion coating further comprises a pigment in an amount of 1-30 wt %, preferably 1-20 wt %, more preferably 2-10 wt %, based on the total dry weight of the polymer dispersion coating.

Such barrier polymers are thus suitably applied by means of a liquid film coating process, i.e. in the form of an aqueous or solvent-based dispersion or solution which, on application, is spread out to a thin, uniform layer on the substrate and thereafter dried.

In some embodiments, the basis weight of the polymer dispersion coating layer in the gas barrier film is in the range of 1-10 gsm, preferably in the range of 1-7 gsm, more preferably in the range of 1-5 gsm.

The inventive gas barrier film is preferably realized without any extrusion coated or lamination coated polyolefin coatings often used in barrier layers for liquid packaging materials. Instead, the inventive gas barrier film uses a polymer dispersion coating, which is more easily separated from the from the fibrous paper and paperboard materials and thereby facilitates re-pulping of the board. However, it is of course also possible to combine the gas barrier film with a polymer layer which is not provided in the form of a polymer dispersion.

[Optional Polymer Layer (e.g. Extrusion Coated PE)]

Thus, in addition to the polymer dispersion layer, the gas barrier film may also comprise a polymer layer which is not provided in the form of a polymer dispersion.

The polymer layer may comprise any of the polymers commonly used in paper or paperboard based packaging materials in general or polymers used in liquid packaging board in particular. Examples include polyethylene (PE), polyethylene terephthalate (PET), polypropylene (PP) and polylactic acid (PLA). Polyethylenes, especially low density polyethylene (LDPE) and high density polyethylene (HDPE), are the most common and versatile polymers used in liquid packaging board.

The polymer layer of the gas barrier film preferably comprises a thermoplastic polymer. In some embodiments, the polymer layer comprises a polyolefin. Thermoplastic polymers, and particularly polyolefins are useful since they can be conveniently processed by extrusion coating techniques to form very thin and homogenous films with good liquid barrier properties. In some embodiments, the polymer layer comprises polypropylene or polyethylene. In preferred embodiments, the polymer layer comprises polyethylene, more preferably LDPE or HDPE.

The polymer layer may comprise one or more layers formed of the same polymeric resin or of different polymeric resins. In some embodiments the polymer layer comprises a mixture of two or more different polymeric resins. In some embodiments the polymer layer is a multilayer structure comprised of two or more layers, wherein a first layer is comprised of a first polymeric resin and a second layer is comprised of a second polymeric resin, which is different from the first polymeric resin.

In some embodiments, the polymer layer is formed by extrusion coating of the polymer onto a surface of the MFC layer. Extrusion coating is a process by which a molten plastic material is applied to a substrate, such as paper or paperboard to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

The basis weight (corresponding to the thickness) of the polymer layer of the inventive gas barrier film is preferably in less than 50 gsm (grams per square meter). In order to achieve a continuous and substantially defect free film, a basis weight of the polymer layer of at least 8 gsm, preferably at least 12 gsm is typically required. In some embodiments, the basis weight of the polymer layer is in the range of 8-50 gsm, preferably in the range of 12-50 gsm.

The inventive gas barrier layer may preferably be used as a gas barrier layer in a paper or paperboard based packaging material, particularly in liquid packaging board (LPB) for use in the packaging of liquids or liquid containing products. Therefore, according to a second aspect illustrated herein, there is provided a paper or paperboard based packaging material comprising:

a paper or paperboard substrate; and a gas barrier film comprising:

a microfibrillated cellulose layer (MFC layer), at least one surface of which has been metallized; and a polymer dispersion coating layer disposed on at least one surface of the MFC layer.

The gas barrier film of the paper or paperboard based packaging material according to the second aspect may be further defined as set out above with reference to the first aspect.

In some embodiments, the MFC layer is attached to the paper or paperboard substrate directly, e.g. when MFC and a binder applied to the substrate as a coating or when MFC is wet laid onto the substrate. Thus, in some embodiments the MFC layer of the gas barrier film is in direct contact with the substrate.

In other embodiments, the MFC layer is attached to the paper or paperboard substrate indirectly, e.g. when the MFC layer or gas barrier film is laminated onto the substrate using an adhesive polymer layer disposed between the substrate and the MFC layer. Thus, in some embodiments the paper or paperboard based packaging material further comprises an adhesive polymer layer disposed between the substrate and the MFC layer of the gas barrier film.

The inventive gas barrier film is preferably realized without any extrusion coated or lamination coated polyolefin coatings often used in barrier layers for liquid packaging materials. Instead, the inventive gas barrier film uses a polymer dispersion coating, which is more easily separated from the from the fibrous paper and paperboard materials and thereby facilitates re-pulping of the board. However, it is of course also possible to combine the gas barrier film with a polymer layer which is not provided in the form of a polymer dispersion.

In some embodiments, the adhesive polymer layer is the polymer dispersion coating layer of the gas barrier film. In other words, the dispersion coating layer of the gas barrier film is sandwiched between the MFC layer of the gas barrier film and the substrate.

In some embodiments, the adhesive polymer layer comprises a polyethylene. Polyethylene is useful since it can be conveniently processed by extrusion coating techniques to form very thin and homogenous films with good liquid barrier properties. The MFC layer or the entire gas barrier film may then be attached to the substrate by an extrusion coating lamination process.

When the MFC layer or gas barrier film is laminated onto the substrate using an adhesive polymer layer, the at least one metallized surface of the MFC layer may be faced either towards or away from the substrate. In a preferred embodiment, the at least one metallized surface of the MFC layer is faced towards the substrate. In this configuration, the metallized surface is protected at the conversion of the packaging material into packages.

In some embodiments, the polymer dispersion coating layer is disposed on the at least one metallized surface of the MFC layer.

The paper or paperboard based packaging material preferably further comprises at least one protective layer disposed on the substrate surface facing away from the gas barrier film.

In some embodiments, the paper or paperboard based packaging material further comprises a first protective layer disposed on the substrate surface facing away from the gas barrier film.

In some embodiments, the paper or paperboard based packaging material further comprises a second protective layer disposed on the gas barrier film surface facing away from the substrate.

The inventive gas barrier film is preferably realized without any extrusion coated or lamination coated polyolefin coatings often used in barrier layers for liquid packaging materials. The gas barrier film instead uses a polymer dispersion coating, which is more easily separated from the from the fibrous paper and paperboard materials and thereby facilitates re-pulping of the board.

In preferred embodiments, the entire paper or paperboard based packaging material is realized without any extrusion coated or lamination coated polyolefin coatings. In such embodiments, the said first protective layer and/or second protective layer are preferably formed by a polymer dispersion coating.

In some embodiments, said first protective layer and/or second protective layer comprises a polymer dispersion coating, preferably a latex, a polyvinyl alcohol, or a polyolefin dispersion coating.

In some embodiments, said first protective layer and/or second protective layer further comprises a pigment in an amount of 30-70 wt %, based on the total dry weight of the protective layer.

In some embodiments, said first protective layer and/or second protective layer comprises at least two sub-layers:

a first sub-layer comprising a polymer dispersion coating with pigment in an amount of 30-70 wt %, based on the total dry weight of the first sub-layer, and a second sub-layer comprising a polymer dispersion coating with pigment in an amount of 0-70 wt %, based on the total dry weight of the second sub-layer.

However, it is of course also possible to combine the gas barrier film with a polymer layer which is not provided in the form of a polymer dispersion coating. Thus, in some embodiments, said first protective layer and/or second protective layer comprises a thermoplastic polymer. In some embodiments, said first protective layer and/or second protective layer comprises a polyolefin. Thermoplastic polymers, and particularly polyolefins, are useful since they can be conveniently processed by extrusion coating techniques to form very thin and homogenous films with good liquid barrier properties. In some embodiments, the first protective layer and/or second protective layer comprises a polypropylene or a polyethylene. In preferred embodiments, the first protective layer and/or second protective layer comprises a polyethylene, more preferably LDPE or HDPE.

The thickness (basis weight) of the protective layers, is selected depending on if the layer is intended to form an outside or inside surface of a container manufactured from the packaging material. For example, an inside surface for a liquid packaging container may require a thicker protective layer to serve as a liquid barrier, whereas on the outside surface a thinner protective layer may be sufficient.

Some of the embodiments encompassed by the present invention are listed below. First and/or second protective layer(s) of for example dispersion coating or extrusion coated polyethylene can also be added in all embodiments. Other additional layers can also be added, as long as the final product includes a metallized MFC layer and a dispersion coating in contact with the metallized MFC layer.

EXEMPLARY EMBODIMENTS

- MFC layer/Metallization layer/Dispersion coating
- Dispersion coating/MFC layer/Metallization layer
- Paperboard/MFC layer/Metallization layer/Dispersion coating
- Paperboard/PE (adhesive)/MFC layer/Metallization layer/Dispersion coating
- Paperboard/Dispersion coating/MFC layer/Metallization layer
- Paperboard/Dispersion coating/MFC layer/Metallization layer/Dispersion coating
- Paperboard/PE (adhesive)/Metallization layer/MFC layer/Dispersion coating
- Paperboard/Dispersion coating/Metallization layer/MFC layer
- Paperboard/Dispersion coating/Metallization layer/MFC layer/Dispersion coating The use of a gas barrier film comprising a metallized MFC and a polymer dispersion coating layer provides both excellent liquid and oxygen barrier properties. Especially remarkable is the high oxygen barrier properties such laminate exhibits at high humidity and temperature. In some embodiments, the paper or paperboard based packaging material according to the second aspect disclosed herein has an oxygen transfer rate (OTR), measured according to the standard ASTM F-1927 at 80% relative humidity and 23° C., of less than 10 cc/$m^2$/24 h/atm, and preferably less than 5 cc/$m^2$/24 h/atm and most preferably less than 2 cc/$m^2$/24 h/atm. This makes the inventive gas barrier film an interesting and viable alternative to the aluminum foil layer commonly used in liquid packaging board for providing liquid and oxygen barrier properties.

In some embodiments, the paper or paperboard substrate used in the paper or paperboard based packaging material has a basis weight in the range of 20-500 g/$m^2$, preferably in the range of 80-400 g/$m^2$.

In some embodiments, the paper or paperboard based packaging material has an oxygen transfer rate (OTR), measured according to the standard ASTM F-1927 at 80% relative humidity and 23° C., of less than 10 cc/$m^2$/24 h/atm, and preferably less than 5 cc/$m^2$/24 h/atm and most preferably less than 2 cc/$m^2$/24 h/atm.

In some embodiments, the paper or paperboard based packaging material is recyclable and has a reject rate according to PTS RH 021/97 of less than 30%, preferably less than 20%.

In preferred embodiments, the gas barrier film or paper or paperboard based packaging material does not comprise any extrusion coated or lamination coated polyolefin coatings typically used as liquid barrier layers heat sealing layers and adhesives in liquid packaging. The adhesive layer, and the optional protective layers of the inventive paper or paperboard based packaging material are instead preferably provided in the form of a polymer dispersion coating. Using a polymer dispersion coating instead of extrusion coated or lamination coated polyolefin coatings facilitates re-pulping and recycling of the paper or paperboard based packaging material.

According to a third aspect illustrated herein, there is provided a carton blank comprising a gas barrier film according to the first aspect or a paper or paperboard based packaging material according to the second aspect.

According to a fourth aspect illustrated herein, there is provided a container, particularly a liquid packaging container, comprising a gas barrier film according to the first aspect or a paper or paperboard based packaging material according to the second aspect.

According to a fifth aspect illustrated herein, there is provided a method for manufacturing a gas barrier film for a paper or paperboard based packaging material, comprising the steps of:

a) providing a layer of microfibrillated cellulose (MFC layer);

b) subjecting at least one surface of the MFC layer to metallization;

c) applying a polymer dispersion coating layer to at least one of the surfaces of the metallized MFC layer.

The MFC, metallization and polymer dispersion coating layer may be further defined as set out above with reference to gas barrier layer of the first aspect.

In some embodiments, the method further comprises laminating the metallized MFC layer to a paper or paperboard substrate before, during or after step c. In a preferred embodiment, the MFC layer is first metallized and then laminated to a paper or paperboard substrate using an adhesive polymer layer disposed between the substrate and the MFC layer.

In some embodiments, the MFC layer in step a) is provided on a paper or paperboard substrate.

In some embodiments, the MFC layer is attached to the paper or paperboard substrate directly, e.g. when MFC and a binder applied to the substrate as a coating or when MFC is wet laid onto the substrate. Thus, in some embodiments the MFC layer of the gas barrier film is in direct contact with the substrate. In a preferred embodiment, the MFC layer is provided on the paper or paperboard substrate by coating with an MFC coating composition (e.g. an MFC dispersion or suspension) followed by drying and/or curing to form the MFC layer.

In other embodiments, the MFC layer is attached to the paper or paperboard substrate indirectly. For example, in some embodiments the MFC layer is provided on the paper or paperboard substrate by lamination of an MFC layer to the substrate using an adhesive polymer layer disposed between the substrate and the MFC layer. Thus, in some embodiments the paper or paperboard based packaging material further comprises an adhesive polymer layer disposed between the substrate and the MFC layer of the gas barrier film.

In a preferred embodiment, the adhesive polymer layer is the polymer dispersion coating layer applied in step c).

In another preferred embodiment, the adhesive polymer layer comprises polyethylene. Polyethylene is useful since it can be conveniently processed by extrusion coating techniques to form very thin and homogenous films with good liquid barrier properties. The MFC layer or the entire gas barrier film may then be attached to the substrate by a lamination process, e.g. extrusion coating lamination or gluing.

In some embodiments, the polymer dispersion coating layer is applied to a metallized surface of the MFC layer.

In some embodiments, the microfibrillated cellulose (MFC) of the MFC layer is unmodified MFC or modified MFC, or a mixture thereof.

In some embodiments, the MFC layer comprises at least 50 wt %, preferably at least 70 wt %, more preferably at least 80 wt % MFC, based on the total dry weight of the MFC layer.

In some embodiments, the MFC layer further comprises polyvinyl alcohol (PVOH).

In some embodiments, the MFC layer further comprises a pigment, preferably a pigment selected from the group consisting of nanoclays and nanoparticles of layered mineral silicates, more preferably bentonite.

In some embodiments, the basis weight of the MFC layer is in the range of less than 55 gsm, preferably in the range of 5-50 gsm, more preferably in the range of 5-20 gsm.

In some embodiments, the metallization comprises vapor deposition of a metal or metal oxide on the MFC layer, preferably by physical vapor deposition (PVD) or chemical vapor deposition (CVD).

In some embodiments, the wherein the polymer dispersion coating is a latex, a polyvinyl alcohol, or a polyolefin dispersion coating.

In some embodiments, the polymer dispersion coating layer is applied to the metallized surface of the MFC layer at a temperature below 100° C., preferably below 80° C.

In some embodiments, the basis weight of the polymer dispersion coating layer is in the range of 1-10 gsm, preferably in the range of 1-7 gsm, more preferably in the range of 1-5 gsm.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Example

In order to evaluate the barrier film of the invention, a test was performed in which the oxygen transmission rate (OTR) and the recyclability of a liquid packaging board structure comprising the film of the invention was evaluated. As a reference, the OTR and recyclability of a liquid packaging board structure comprising a metallized MFC film, which comprised a polyethylene layer instead of the dispersion coating layer, was further evaluated.

Preparation of Metallized MFC Films

The MFC films used in the example were prepared as follows: A 50% sorbitol solution was prepared by adding sorbitol to water followed by heating to 60° C. and stirring for 30 minutes. An MFC suspension was mixed with high shear mixing for 1 hour prior to addition of the sorbitol solution. The mixture was mixed for an additional 1 hour. The mixture was thereafter deaerated in a vacuum assisted mixing using a speed mixer. The films were produced by rod coating the mixture on a plastic surface, which was then left for air drying for at least 12 h at a temperature of 23° C. After drying, the films were separated from the plastic substrate. The obtained films had a thickness of 35-50 μm and a grammage of about 50 gsm. The thereof produced films comprised 87 wt % MFC and 13 wt % sorbitol, as calculated on the total solid content of the films.

The films were metallized with aluminum using physical vapor deposition to a thickness of 40 nm.

Preparation of Liquid Packaging Board (LPB) Laminates

The films were then laminated with extruded low density polyethylene (LDPE) into LPB structures. The paperboard substrate used was double mineral coated Natura 200 mN from Stora Enso with a grammage of 240 gsm.

The sample of the invention (Sample 1) was prepared as follows. The paperboard substrate was rod coated with SA latex (around 5 gsm), whereupon the metallized MFC film was laminated to the coated substrate in a calender nip at 70ˆ.

Thereafter LDPE was extrusion coated on both sides of the laminate. The MFC film was applied with the metallization facing the LDPE (50 gsm) layer.

The sample of the invention thus formed the following structure:

Sample 1

LDPE (15 gsm)/Paperboard/Latex/MFC film/metallization layer/LDPE (50 gsm)

A reference sample was prepared by laminating the metallized MFC film with extruded LDPE to the paperboard substrate. The laminate formed was thereafter extrusion coated on both sides with LDPE. The MFC film was applied in this structure so that the metallization layer were facing the LDPE (50 gsm) layer.

The reference sample thus formed the following structure:

Reference 1

LDPE (15 gsm)/paperboard/LDPE/MFC film/metallization layer/LDPE (50 gsm).

For both the produced laminates (Sample 1 and Reference 1), the LDPE (15 gsm) is intended to form the outside layer of a thereof formed package, while the LDPE (50 gsm) is intended to form the inside layer of the thereof formed package, facing the contained liquid.

The laminates were evaluated with respect to OTR according to ASTM F-1927 and WVTR at a relative humidity of 80% at 23° C. (23/80). The laminates were preconditioned in the climate to be measured in for 2 weeks prior to the measurement. The OTR values were all stable at the end of the measuring time. A recyclability test was made according to PTS method RH 021/197. The results are summarized in Table 1.

TABLE 1

| | OTR [cc/m$^2$/24 h/atm] | WVTR [g/m$^2$/day] | Reject rate [%] |
|---|---|---|---|
| Sample 1 | 18 | 2.0 | 26.2 +/− 4.4 |
| Reference 1 | 20 | 1.9 | 34.2 +/− 5.7 |

The results show that there is no significant difference in OTR or WVTR for the sample produced according to the invention and the reference, while the reject rate differs with 8%. Thus, surprisingly the use of latex instead of LDPE in the lamination layer does not affect the barrier properties but remarkably improves the rejection rate.

The invention claimed is:

1. A gas barrier film for a paper or paperboard based packaging material, said gas barrier film comprising:

a microfibrillated cellulose layer (MFC layer), at least one surface of which has been metallized; and a polymer dispersion coating layer disposed on at least one surface of the MFC layer between the MFC layer and the paper or paperboard based packaging material, wherein a basis weight of the polymer dispersion coating layer is in a range of 1-7 gsm, wherein a thickness of the gas barrier film is between 35 to 50 μm.

2. The gas barrier film according to claim 1, wherein the MFC layer comprises at least 50 wt % MFC, based on a total dry weight of the MFC layer.

3. The gas barrier film according to claim 1, wherein the MFC layer further comprises a pigment.

4. The gas barrier film according to claim 1, wherein a basis weight of the MFC layer is less than 55 gsm.

5. The gas barrier film according to claim 1, wherein the metallized surface of the MFC layer is formed by vapor deposition of a metal or metal oxide on the MFC layer.

6. The gas barrier film according to claim 1, wherein the metallized surface of the MFC layer has a metal layer thickness in the range of 10-100 nm.

7. The gas barrier film according to claim 1, wherein the polymer dispersion coating layer is disposed on the at least one surface of the MFC layer which has been metallized.

8. The gas barrier film according to claim 1, wherein the polymer dispersion coating is a latex, a polyvinyl alcohol, or a polyolefin dispersion coating.

9. The gas barrier film according to claim 1, wherein the polymer dispersion coating further comprises a pigment in an amount of 1-30 wt %, based on a total dry weight of the polymer dispersion coating.

10. A paper or paperboard based packaging material comprising:

a paper or paperboard substrate; and a gas barrier film according to claim 1.

11. The paper or paperboard based packaging material according to claim 10, wherein the dispersion coating layer of the gas barrier film is sandwiched between the MFC layer of the gas barrier film and the substrate.

12. The paper or paperboard based packaging material according to claim 10, wherein the polymer dispersion coating layer is disposed on the at least one metallized surface of the MFC layer.

13. The paper or paperboard based packaging material according to claim 10, further comprising a first protective layer disposed on the substrate surface facing away from the gas barrier film.

14. The paper or paperboard based packaging material according to claim 13, further comprising a second protective layer disposed on the gas barrier film surface facing away from the substrate.

15. The paper or paperboard based packaging material according to claim 14, wherein said first protective layer, or said second protective layer, or both comprises a polymer dispersion coating.

16. The paper or paperboard based packaging material according to claim 15, wherein said first protective layer, or said second protective layer, or both further comprises a pigment in an amount of 30-70 wt %, based on a total dry weight of the protective layer.

17. The paper or paperboard based packaging material according to claim 12, having an oxygen transfer rate (OTR), measured according to the standard ASTM F-1927 at 80% relative humidity and 23° C., of less than 10 $cc/m^2/24$ h/atm.

18. The paper or paperboard based packaging material according to claim 12, having a reject rate according to PTS RH 021/97 of less than 30%.

19. A container comprising a paper or paperboard based packaging material according to claim 10.

20. The gas barrier film according to claim 1, wherein the MFC consists of unmodified MFC.

* * * * *